United States Patent Office 3,445,410
Patented May 20, 1969

3,445,410
STORAGE STABLE COATING COMPOSITION COMPRISING ALKYD RESIN, ESTERIFIED INORGANIC ACID, AND VOLATILE BUFFER MATERIAL
John S. Coulter, Ankeny, Iowa, assignor to Iowa Paint Manufacturing Company, Incorporated, Des Moines, Iowa, a corporation of Iowa
No Drawing. Continuation-in-part of application Ser. No. 590,207, Oct. 28, 1966. This application May 23, 1967, Ser. No. 640,475
Int. Cl. C09d *3/66;* C08g *51/78*
U.S. Cl. 260—21                                  25 Claims

ABSTRACT OF THE DISCLOSURE

A coating composition and the method of making the same which includes a combination of an alkyd resin, a urea resin, an inorganic acid and a volatile buffer material. The inorganic acid causes cross-linking of the alkyd and urea resins when the buffer material evaporates upon application of the composition as a film.

---

This is a continuation-in-part application of the application, Ser. No. 590,207 filed Oct. 28, 1966 (now abandoned).

The combination of an alkyd resin and urea resin will produce a hard surface coating composition inasmuch as these components are capable of cross-linking to provide the desired hard enamel surface. However, these ingredients are normally cured by the application of heat to produce the desired result. Organic acid has been used to trigger the reaction between the alkyd resin and the urea resin, but the shelf life of such a mixture is very limited and the mixture begins to jell after a period of eight hours to three days. Thus, heretofore it has not been possible to apply a paint substance and allow it to air-dry and at the same time obtain the hard finish of the baked-on curing process, unless the organic acid is added to the alkyd resin and urea resin combination at the time of use.

Thus, it is a principal object of this invention to provide an air-drying coating composition which is storage stable.

A further object of this invention is to provide a coating composition and the method of making the same.

A further object of this invention is to provide an air-drying coating composition which is storage stable and which includes a combination of an alkyd resin enamel, a urea resin, an inorganic acid and a volatile buffer material.

A further object of this invention is to provide a coating composition wherein the cross-linking of the alkyd and urea resin is produced by an inorganic acid when a buffer material provided therein evaporates upon application of the composition as a film.

A further object of this invention is to provide an air-drying coating composition which results in the hard finish of a baked-on curing process.

A further object of this invention is to provide a coating composition which facilitates easy packaging and handling thereof.

A further object of this invention is to provide a coating composition which is durable in use and attractive in appearance.

These and other objects will be apparent to those skilled in the art.

Generally speaking, the coating composition of this invention consists of a combination of an alkyd resin, a urea resin, an inorganic acid and a buffer material and the method of combining the same to produce an air-drying coating composition having the qualities of a baked-on coating composition.

Table I below lists: (1) the preferred ingredients of the compositions; (2) the permissive percentage range by weight of the ingredients; and (3) comments. The comments section of Table I lists the preferred ingredients by specific name or otherwise and also lists alternate ingredients which may be substituted for the preferred ingredients. The alternate ingredients have been found to work although somewhat less satisfactorily than the preferred ingredients.

TABLE I

| Preferred material | Permissive percent range by weight | Comments |
|---|---|---|
| Pigment | 4.35–45.0 [1] | Non-reactive pigments. |
| Wetting agents | .02–.097 [1] | E.g., soya lecithin. |
| Suspension agent | .25–.72 [1] | E.g., alkyl ammonium montmorillonite. |
| Alkyd resin | 15.40–16.20 [1] | Acid number of 5 to 9, OH value of 36–50. |
| Xylene | 2.16–4.15 [1] | Boiling range, 275–286° F. |
| VM&P naphtha | 1.33–5.66 [1] | Boiling range, 216–288° F. |
| Alkyd resin | 15.40–16.20 [1] | Acid number of 5 to 9, OH value of 36–50. |
| Toluene | .83–3.28 [1] | Boiling range, 228–232° F. |
| Alkyd resin | 23.42–24.07 [1] | Acid number of 5 to 9, OH value of 36–50. |
| 6% zirconium drier | .6–.65 [2] | Prefer naphthenates. |
| 6% manganese drier | .35–.37 [2] | Do. |
| 6% cobalt drier | .6–.65 [2] | Do. |
| Anti-skinning agent | .21–.22 | E.g., a volatile oxime. |
| Slip agent | 2.0–2.10 [2] | E.g., organo silicone. |
| Cyclohexanone | 1.44–1.60 [3] | |
| Aromatic hydrocarbon | 1.67–2.0 [3] | E.g., naphtha (boiling range, 316–349° F.) |
| N-butyl alcohol | 1.6–1.7 [3] | N-butanol may be replaced by diisobutyl carbinol. |
| Methyl isobutyl ketone | 2.4–3.4 [3] | E.g., MIBK preferred but other ketones such as mesityl oxide, methyl ethyl ketone could be utilized. |
| Inorganic acid | .031–.032 [2] | 30% H₂SO₄ solution percentage used is based on alkyd OH value. |
| Buffer agent | .3% of weight of 30% H₂SO₄ solution. | E.g., morpholine may be substituted by n-substituted morpholine. |
| Isobutylated Urea-formaldehyde resin | 4.4–4.5 [3] | |

[1] Percent by weight of total composition.
[2] Percent by weight of alkyd non-volatile weight.
[3] Percent by weight of total vehicle weight.

The pigment used in this composition will obviously vary according to the desired color of the composition. However, the pigment must be a nonreactive type pigment to obtain the optimum results. The wetting agent will vary with the particular pigment being used but soya lecithin may be used. The suspension agent will also vary with the particular pigment being used.

The alkyd resin must have a hydroxyl (OH) value of 36–50 and should have an acid number of 5 to 9. The alkyd resin also must be free of epoxidized material. Xylene, VM&P naphtha and toluene can be used alone or in combination, depending on the end use of the enamel, and can range from 12.0–15.0% of the total vehicle weight. The driers are preferably from the naphthenate class but can be from the octoates or tallates and consist of 6% zirconium drier, 6% cobalt drier and 6% manganese drier. The antiskinning agent is preferably a volatile oxime. The slip agent is preferably an organo silicone. Cyclohexanone (ketohexamethylene) is extremely important to the composition and no substitution should be made. The aromatic hydrocarbons used in this composition should have boiling ranges of 316–349° F., 275–286° F., and 228–232° F., and xylene and toluene are of these boiling ranges, and are readily available on the market; the naphtha should have a boiling range of 216–288° F. N-butyl alcohol is also an important ingredient of the composition which can be replaced by diisobutyl carbinol and alcohols of similar structure that are effective solvents for urea and melamine resins.

Ketones such as mesityl oxide or methyl ethyl ketone can be used with varying amounts of success, however, MIBK is preferred for the best results. The 30% $H_2SO_4$ solution listed in Table I is extremely important to this composition. The percentage to be used in this composition is based on alkyd OH value and is preferably .031 to .032% of the alkyd non-volatile weight. The composition by weight of the 30% $H_2SO_4$ solution is 35% benzol, 35% butanol and 30% $H_2SO_4$. To esterify the $H_2SO_4$, the benzol and butanol must be first blended and then the $H_2SO_4$ slowly added thereto and blended therewith. It is possible that hydrochloric, hydrobromic or nitric acid could be substituted for the sulfuric acid, but sulfuric acid is vastly superior.

The morpholine used as a buffer material can be replaced in the proportion indicated by n-substituted morpholines such as a n-methyl morpholine, n-aminopropyl morpholine or n-hydroxyethyl morpholine. Also, monoethanolamine, diethanolamine or triethanolamine may be used as a substitute for morpholine in the proportions indicated. However, none of the beforementioned buffer materials will work as satisfactorily as morpholine. The morpholine preferably comprises .3% by weight of the 30% $H_2SO_4$ solution.

The urea resin is preferably isobutylated urea resin and its use is preferred over other specific urea-formaldehyde resins which could serve as inferior substitutes.

The preferred alkyd resin of this invention is a colloidal dispersion of 15–45 parts of neutral and/or fatty acid copolymer of vinyl toluene or styrene in a continuum representing a solution of alkyd polymer derived from 50–70% of unsaturated vegetable oil fatty acids; the remainder being polymeric ester derived from 15–25% dibasic acid (phthalic, isophthalic, fumeric or maleic) and a trifunctional polyol like glycerol and/or trimethylolpropane. The resin is controlled by polymerization of the vinyl toluene monomer added in one or more increments as a reactive solvent during the process of esterification of the alkyd components. The interpolymerization of the vinyl toluene and the polymeric ester, at 60% solids in xylene and VM&P has the following physical properties:

| | |
|---|---|
| Nonvolatile | 60% ±1. |
| Solvent | Xylol & VM&P. |
| Viscosity | 2–23. |
| Viscosity | 27–47 stokes. |
| Acid No. (on nonvolatile) | 4–8. |
| Color | 5 max. |
| WX/gal. | 8:0#. |
| OH range | 45 average. |

The composition is made in the following manner. The pigment, wetting agents, suspension agents, the first (Table I) alkyd resin material, xylene and VM&P naphtha are charged to dispersing equipment which can be either a porcelain ball mill, a sand mill or a roller mill. The material is then taken to a dispersion-type enamel grind. This mixture is then added to the second (Table I) alkyd resin material and mixed for 15 to 30 minutes. The toluene is used to rinse or clean the equipment and is then added to the mixture. The third (Table I) alkyd resin material is added to the batch while it is mixing and the mixing is continued for another 15 minutes. To this point, the procedure has been normal to regular paint production. Zirconium drier, cobalt drier, manganese drier and the antiskinning agent are thoroughly blended and then added to the batch with strong agitation. The cyclohexanone, aromatic hydrocarbon, N-butyl alcohol, methyl isobutyl ketone, 30% $H_2SO_4$ solution, and approximately one-half of the buffer material are thoroughly blended and slowly added to the batch which is allowed to mix while the blending operation was completed. The 30% $H_2SO_4$ solution should be previously prepared by mixing benzol and butanol together and then slowly adding $H_2SO_4$. This solution must cool to room temperature before use.

The remainder of the buffer material is then added to the batch. The slip agent can then be added or it could have been added to the batch after the drier blend was added thereto. The batch is then thoroughly mixed for 15 minutes. The isobutylated urea resin is then added while the batch is mixing and the mixing is continued for one-half hour.

It is imperative that the urea resin be added to the mixture at this point as a "cheesy" type coating will result if otherwise prepared. It should be noted that the various ingredients and percentages thereof can be and will be varied slightly depending on the desired end product. Table I lists those ingredients and percentages which will result in the most satisfactory product. Compositions which are less than satisfactory will be obtained when said ingredients and percentages are varied to any degree beyond that indicated. The percent by weight of the alkyd resin can vary in the different production stages but the total is preferably 55.31 plus or minus 1%.

The product is then placed in suitable containers for storage and/or shipment. Cross-linking of the alkyd and urea resin is prevented by the buffer agent during the storage of the coating composition thereby preventing the composition from jelling. When the coating composition is applied as a film at room temperatures of 50° F. to 80° F., the buffer material evaporates thereby permitting the inorganic acid to trigger the reaction between the urea and alkyd resins which results in a cross linking thereof. The resulting coating is comparable to those coatings produced by the "baked-on" curing process. When applied at normal room temperatures, the coating will be "dust free" in approximately 30–60 minutes depending upon the humidity. The coating continues to cure for about 72 hours and will be maximum cured by that time.

It can be appreciated that the buffering feature of this composition greatly increases the storage life of the composition as well as conveniently providing a finish which is comparable to the "baked-on" finishes. Thus, it can be seen that the composition accomplishes at least all of its stated objectives.

Tables II, III, IV, V and VI below list the formulae for the coating composition of this invention when orange (conventional air or airless spray), white (conventional air or airless spray), white (cold or hot electrostatic spray), red (conventional air or airless spray) and green (flow coat) enamels are desired and which are obtained by the addition of the required pigment.

TABLE II.—ORANGE ENAMEL (CONVENTIONAL AIR OR AIRLESS SPRAY)

| Preferred material | Preferred percent by weight | Permissive percent range by weight | Comments |
|---|---|---|---|
| Pigment | 22.13 [1] | 20.0–24.0 [1] | Non-reactive orange pigment. |
| Wetting agents | .02 [1] | .02–.04 [1] | E.g., soya lecithin. |
| Suspension agent | .25 [1] | .25–.50 [1] | E.g., alkyl ammonium montmorillonite. |
| Alkyd resin | 15.82 [1] | 15.40–16.20 [1] | Acid number of 5 to 9, OH value of 36–50. |
| Xylene | 2.66 [1] | 2.16–3.16 [1] | Boiling range, 275–286° F. |
| VM&P naphtha | 5.16 [1] | 4.66–5.66 [1] | Boiling range, 216–288° F. |
| Alkyd resin | 15.82 [1] | 15.40–16.20 [1] | Acid number of 5 to 9, OH value of 36–50. |
| Toluene | 1.33 [1] | .83–1.83 [1] | Boiling range, 228–232° F. |
| Alkyd resin | 23.67 [1] | 23.42–24.07 [1] | Acid number of 5 to 9, OH value of 36–50. |
| 6% zirconium drier | .6 [2] | .6–.65 [2] | Prefer naphthenates. |
| 6% manganese drier | .36 [2] | .35–.37 [2] | Do. |
| 6% cobalt drier | .6 [2] | .6–.65 [2] | Do. |
| Antiskinning agent | .21 [2] | .21–.22 [2] | E.g., a volatile oxime. |
| Slip agent | 2.0 [2] | 2.0–2.05 [2] | E.g., organo silicone. |
| Cyclohexanone | 1.52 [3] | 1.44–1.60 [3] | |
| Aromatic hydrocarbon | 1.8 [3] | 1.7–2.0 [3] | E.g., naphtha (boiling range, 316–349° F). |
| N-butyl alcohol | 1.6 [3] | 1.6–1.7 [3] | N-butanol may be replaced by diisobutyl carbinol. |
| Methyl isobutyl ketone | 3.0 [3] | 2.4–3.4 [3] | E.g., MIBK preferred but other ketones such as mesityl oxide, methyl ethyl ketone could be utilized. |
| Inorganic acid | .031 [2] | .031–.032 [2] | 30% $H_2SO_4$ solution percentage used is based on alkyd OH value. |
| Buffer agent | .3% of weight of 30% $H_2SO_4$ solution. | | E.g., morpholine may be substituted by n-substituted morpholine. |
| Isobutylated urea formaldehyde resin. | 4.4 [3] | 4.4–4.5 [3] | |

[1] Percent by weight of total composition.
[2] Percent by weight of alkyd non-volatile weight.
[3] Percent by weight of total vehicle weight.

TABLE III.—WHITE ENAMEL (CONVENTIONAL AIR OR AIRLESS SPRAY)

| Preferred material | Preferred percent by weight | Permissive percent range by weight | Comments |
|---|---|---|---|
| Pigment | 21.81 [1] | 20.0–23.0 [1] | White pigment. |
| Wetting agents | .02 [1] | .02–.04 [1] | E.g., soya lecithin. |
| Suspension agent | .35 [1] | .25–.50 [1] | E.g., alkyl ammonium montmorillonite. |
| Alkyd resin | 15.82 [1] | 15.40–16.20 [1] | Acid number of 5 to 9, OH value of 36–50. |
| Xylene | 2.66 [1] | 2.16–3.16 [1] | Boiling range, 275–286° F. |
| VM&P naphtha | 5.16 [1] | 4.66–5.66 [1] | Boiling range, 216–288° F. |
| Alkyd resin | 15.82 [1] | 15.40–16.20 [1] | Acid number of 5 to 9, OH value of 36–50. |
| Toluene | 1.33 [1] | .83–1.83 [1] | Boiling range, 228–232° F. |
| Alkyd resin | 23.43 [1] | 23.42–24.07 [1] | Acid number of 5 to 9, OH value of 36–50. |
| 6% zirconium drier | .6 [2] | .6–.65 [2] | Prefer naphthenates. |
| 6% manganese drier | .36 [2] | .35–.37 [2] | Do. |
| 6% cobalt drier | .6 [2] | .6–.65 [2] | Do. |
| Antiskinning agent | .21 [2] | .21–.22 [2] | E.g., a volatile oxime. |
| Slip agent | 2.0 [2] | 2.0–2.05 [2] | E.g., organo silicone. |
| Cyclohexanone | 1.52 [3] | 1.44–1.60 [3] | |
| Aromatic hydrocarbon | 1.80 [3] | 1.7–2.0 [3] | E.g., naphtha (boiling range, 316–349° F.). |
| N-butyl alcohol | 1.6 [3] | 1.6–1.7 [3] | N-butanol may be replaced by diisobutyl carbinol. |
| Methyl isobutyl ketone | 3.0 [3] | 2.4–3.4 [3] | E.g., MIBK preferred but other ketones such as mesityl oxide, methyl ethyl ketone could be utilized. |
| Inorganic acid | .031 [2] | .031–.032 [2] | 30% $H_2SO_4$ solution percentage used is based on alkyd OH value. |
| Buffer agent | .3% of weight of 30% $H_2SO_4$ solution. | | E.g., morpholine may be substituted by n-substituted morpholine. |
| Isobutylated urea-formaldehyde resin. | 4.4 [3] | 4.4–4.5 [3] | |

[1] Percent by weight of total composition.
[2] Percent by weight of alkyd non-volatile weight.
[3] Percent by weight of total vehicle weight.

TABLE IV.—WHITE ENAMEL (COLD OR HOT ELECTROSTATIC SPRAY)

| Preferred material | Preferred percent by weight | Permissive percent range by weight | Comments |
|---|---|---|---|
| Pigment | 21.18 [1] | 20.0–23.0 [1] | White pigment. |
| Wetting agents | .05 [1] | .02–.08 [1] | E.g., soya lecithin. |
| Suspension agent | .72 [1] | .50–.90 [1] | E.g., alkyl ammonium montmorillonite. |
| Alkyd resin | 15.82 [1] | 15.40–16.20 [1] | Acid number of 5 to 9, OH value of 36–50. |
| Xylene | 3.25 [1] | 3.0–3.50 [1] | Boiling range, 275–286° F. |
| VM & P naphtha | 1.33 [1] | 1.20–1.60 [1] | Boiling range, 216–288° F. |
| Alkyd resin | 15.82 [1] | 15.40–16.20 [1] | Acid number of 5 to 9, OH value of 36–50. |
| Toluene | 1.33 [1] | .83–1.83 [1] | Boiling range, 228–232° F. |
| Aromatic hydrocarbon | 1.44 [2] | 1.36–1.48 [2] | E.g., naphtha (boiling range, 316–349° F.). |
| Alkyd resin | 23.22 [2] | 23.0–24.07 [1] | Acid number of 5 to 9, OH value of 36–50. |
| 6% zirconium drier | .6 [3] | .6–.65 [3] | Prefer naphthenates. |
| 6% manganese drier | .36 [3] | .35–.37 [3] | Do. |
| 6% cobalt drier | .6 [3] | .6–.65 [3] | Do. |
| Antiskinning agent | .21 [3] | .21–.22 [3] | E.g., a volatile oxime. |
| Slip agent | 2.0 [3] | 2.0–2.05 [3] | E.g., organo silicone. |
| Cyclohexanone | 1.52 [2] | 1.44–1.60 [2] | |
| Aromatic hydrocarbon | 1.8 [2] | 1.7–2.0 [2] | E.g., naphtha (boiling range, 316–349° F.). |
| N-butyl alcohol | 1.6 [2] | 1.6–1.7 [2] | N-butanol may be replaced by diisobutyl carbinol. |
| Methyl isobutyl ketone | 3.0 [2] | 2.4–3.4 [2] | E.g., MIBK preferred but other ketones such as mesityl oxide, methyl ethyl ketone could be utilized. |
| Inorganic acid | .031 [3] | .031–.032 [3] | 30% $H_2SO_4$ solution percentage used is based on alkyd OH value. |
| Buffer agent | .3% of weight of 30% $H_2SO_4$ solution. | | E.g., morpholine may be substituted by n-substituted morpholine. |
| Isobutylated urea formaldehyde resin. | 4.4 [2] | 4.4–4.5 [2] | |

[1] Percent by weight of total composition.
[2] Percent by weight of total vehicle weight.
[3] Percent by weight of alkyd non-volatile weight.

TABLE V.—RED ENAMEL (CONVENTIONAL AIR OR AIRLESS SPRAY)

| Preferred material | Preferred percent by weight | Permissive percent range by weight | Comments |
|---|---|---|---|
| Pigment | 9.36 [1] | 8.0–10.2 [1] | Red pigment. |
| Wetting agents | .02 [1] | .02–.04 [1] | E.g., soya lecithin. |
| Suspension agent | .25 [1] | .25–.50 [1] | E.g., alkyl ammonium montmorillonite. |
| Alkyd resin | 15.82 [1] | 15.40–16.20 [1] | Acid number of 5 to 9, OH value of 36–50. |
| Xylene | 3.16 [1] | 2.8–3.3 [1] | Boiling range, 275–286° F. |
| VM & P naphtha | 2.14 [1] | 1.85–2.30 [1] | Boiling range, 216–288° F. |
| Alkyd resin | 15.82 [1] | 15.40–16.20 [1] | Acid number of 5 to 9, OH value of 36–50. |
| Toluene | 3.28 [1] | 2.8–3.5 [1] | Boiling range, 228–232° F. |
| Alkyd resin | 24.07 [1] | 23.70–24.40 [1] | Acid number of 5 to 9, OH value of 36–50. |
| 6% zirconium drier | .6 [2] | .6–.65 [2] | Prefer naphthenates. |
| 6% manganese drier | .36 [2] | .35–.37 [2] | Do. |
| 6% cobalt drier | .6 [2] | .6–.65 [2] | Do. |
| Antiskinning agent | .21 [2] | .21–.22 [2] | E.g., a volatile oxime. |
| Slip agent | 2.0 [2] | 2.0–2.05 [2] | E.g., organo silicone. |
| Cyclohexanone | 1.52 [3] | 1.44–1.60 [3] | |
| Aromatic hydrocarbon | 1.67 [3] | 1.58–2.0 [3] | E.g., naphtha (boiling range, 316–349° F.). |
| N-butyl alcohol | 1.6 [3] | 1.6–1.7 [3] | N-butanol may be replaced by diisobutyl carbinol. |
| Methyl isobutyl ketone | 3.0 [3] | 2.4–3.4 [3] | E.g., MIBK preferred but other ketones such as mesityl oxide, methyl ethyl ketone could be utilized. |
| Inorganic acid | .031 [2] | .031–.032 [2] | 30% H₂SO₄ solution. percentage used is based on alkyd OH value. |
| Buffer agent | .3% of weight of 30% H₂SO₄ solution. | | E.g., morpholine may be substituted by n-substituted morpholine. |
| Isobutylated urea-formaldehyde resin. | 4.4 [3] | 4.4–4.5 [3] | |

[1] Percent by weight of total composition.
[2] Percent by weight of alkyd non-volatile weight.
[3] Percent by weight of total vehicle weight.

TABLE VI.—GREEN ENAMEL (FLOW COAT APPLICATION)

| Preferred material | Preferred percent by weight | Permissive percent range by weight | Comments |
|---|---|---|---|
| Pigment | 14.60 [1] | 13.5–15.5 [1] | Green pigment. |
| Wetting agents | .097 [1] | .08–.12 [1] | E.g., soya lecithin. |
| Suspension agent | .25 [1] | .25–.50 [1] | E.g., alkyl ammonium montmorillonite. |
| Alkyd resin | 16.20 [1] | 16.00–16.40 [1] | Acid number of 5 to 9, OH value of 36–50. |
| Xylene | 4.15 [1] | 3.80–4.30 [1] | Boiling range, 275–286° F. |
| VM & P naphtha | 1.49 [1] | 1.30–1.60 [1] | Boiling range, 216–288° F. |
| Alkyd resin | 16.20 [1] | 16.00–16.40 [1] | Acid number of 5 to 9, OH value of 36–50. |
| Toluene | 1.83 [1] | 1.60–2.0 [1] | Boiling range, 228–232° F. |
| Aromatic hydrocarbon | 3.18 [2] | 2.9–3.3 [2] | Naphtha (boiling range, 316–349° F.). |
| Alkyd resin | 24.07 [1] | 23.5–24.5 [1] | Acid number of 5 to 9, OH value of 36–50. |
| 6% zirconium drier | .6 [3] | .6–.65 [3] | Prefer naphthenates. |
| 6% manganese drier | .36 [3] | .35–.37 [3] | Do. |
| 6% cobalt drier | .6 [3] | .6–.65 [3] | Do. |
| Antiskinning agent | .21 [3] | .21–.22 [3] | E.g., a volatile oxime. |
| Slip agent | 2.10 [3] | 2.0–2.2 [3] | E.g., organo silicone. |
| Cyclohexanone | 1.60 [2] | 1.45–1.75 [2] | |
| Aromatic hydrocarbon | 2.0 [2] | 1.8–2.2 [2] | E.g., naphtha (boiling range, 316–349° F.). |
| N-butyl alcohol | 1.6 [2] | 1.6–1.7 [2] | N-butanol may be replaced by diisobutyl carbinol. |
| Methyl isobutyl ketone | 3.0 [2] | 2.4–3.4 [2] | E.g., MIBK preferred but other ketones such as mesityl oxide, methyl ethyl ketone could be utlized. |
| Inorganic acid | .031 [3] | .031–.032 [3] | 30% H₂SO₄ solution percentage used is based on alkyd OH value. |
| Buffer agent | .3% of weight of 30% H₂SO₄ solution. | | E.g., morpholine may be substituted by n-substituted morpholine. |
| Isobutylated urea-formaldehyde resin. | 4.4 [2] | 4.4–4.5 [2] | |

[1] Percent by weight of total composition.
[2] Percent by weight of total vehicle weight.
[3] Percent by weight of alkyd non-volatile weight.

The method of making the coating compositions of Tables II, III, and V is identical to that described for Table I.

The method of making the coating compositions of Tables IV and VI is identical to that described for Table I except that an aromatic hydrocarbon is added to the batch after the toluol has been added thereto.

In Tables II–VI the preferred ingredients and preferred percentages are indicated which will produce the most satisfactory coating composition. However, the percentages and ingredients can be varied somewhat with a resultant loss of quality in the finished product.

Various changes and modifications may be made in carrying out the present invention without departing from the spirit and scope thereof. Insofar as these changes and modifications are within the purview of the annexed claims, they are to be considered as part of my invention.

I claim:

1. A storage stable coating composition, comprising:
   a quantity of an alkyd resin having a hydroxyl value of between 36 and 50,
   a quantity of a urea-formaldehyde resin,
   a quantity of an esterified inorganic acid, and
   a quantity of an amine buffer material inhibiting the cross-linking of said alkyd resin and said urea resin by said esterified inorganic acid,
   said buffer material being volatile at normal room temperatures when exposed to the atmosphere so that exposure of said coating composition to the atmosphere as a layer of film at normal room temperature will permit the evaporation of said buffer material and will permit the subsequent cross-linking of said alkyd resin and said urea resin to form a hard and durable film coating.

2. The composition of claim 1 wherein the esterified inorganic acid is comprised of esterified $H_2SO_4$.

3. The composition of claim 2 wherein the inorganic acid comprises .031 to .032 percent by weight of the alkyd nonvolatile weight.

4. The composition of claim 1 wherein said esterified inorganic acid is the ester of $H_2SO_4$, benzol and butanol.

5. The composition of claim 1 wherein the buffer material is comprised of morpholine.

6. The composition of claim 5 wherein the morpholine comprises .3% by weight of the esterified inorganic acid.

7. The composition of claim 1 wherein the buffer material is comprised of morpholine and the esterified inorganic acid is comprised of esterified $H_2SO_4$.

8. The composition of claim 1 wherein said urea-formaldehyde resin is isobutylated.

9. The composition of claim 1 wherein the urea-formaldehyde resin comprises 4.4 to 4.5% of the total vehicle weight.

10. The composition of claim 1 wherein the alkyd resin comprises 53.8 to 57.3% by weight of the total composition.

11. The composition of claim 1 wherein the alkyd resin has an acid number of between 5 and 9, inclusive.

12. The composition of claim 1 wherein said alkyd resin is comprised of a colloidal dispersion of 15 to 45 parts of neutral and fatty acid copolymer of vinyl toluene in a continuum representing a solution of alkyd polymer derived from 50 to 70% of unsaturated vegetable oil fatty acids, the remainder of the alkyd resin being a polymeric ester derived from 15 to 25% dibasic acid and a trifunctional polyol.

13. The composition of claim 1 wherein said alkyd resin is comprised of a colloidal dispersion of 15 to 45 parts of a fatty acid copolymer of vinyl toluene in a continuum representing a solution of alkyd polymer derived from 50 to 70% of unsaturated vegetable oil fatty acids, the remainder of the alkyd resin being a polymeric ester derived from 15 to 25% dibasic acid and a trifunctional polyol.

14. The composition of claim 1 wherein said alkyd resin is comprised of a colloidal dispersion of 15 to 45 parts of neutral and fatty acid copolymer of styrene in a continuum representing a solution of alkyd polymer derived from 50 to 70% of unsaturated vegetable oil fatty acids, the remainder of the alkyd resin being a polymeric ester derived from 15 to 25% dibasic acid and a trifunctional polyol.

15. The method of making an air-drying storage stable coating composition, comprising the following steps,
   esterifying a quantity of inorganic acid,
   mixing a quantity of an alkyd resin material having a hydroxyl value between 36 and 50 with said esterified inorganic acid,
   mixing a quantity of an amine buffer material with the mixture of said alkyd resin and esterified inorganic acid,
   and mixing a quantity of a urea-formaldehyde resin material with the alkyd resin-esterified inorganic acid-buffer material mixture,
   said buffer material preventing the cross-linking of the alkyd resin and urea resin by the esterified inorganic acid until the composition is applied as a film thereby permitting the buffer material to evaporate.

16. The method of claim 15 wherein the buffer material is comprised of morpholine.

17. The method of claim 15 wherein the inorganic acid is comprised of a $H_2SO_4$ solution.

18. The method of claim 17 wherein the $H_2SO_4$ solution comprises .031 to .032 percent by weight of the alkyd nonvolatile weight.

19. The method of claim 18 wherein the buffer material is comprised of morpholine, said morpholine comprising .3% by weight of the $H_2SO_4$ solution.

20. The method of claim 15 wherein said inorganic acid is esterified by benzol and butanol.

21. The method of claim 15 wherein said inorganic acid is $H_2SO_4$ and is esterified by benzol and butanol.

22. The method of claim 21 wherein said benzol and said butanol are first blended together and the $H_2SO_4$ is then blended to the mixture of said benzol and said butanol.

23. The method of claim 15 wherein the alkyd resin material comprises 53.8 to 57.3 percent by weight of the total mixture.

24. The method of claim 15 wherein the alkyd resin has an acid number of between 5 and 9, inclusive.

25. The method of claim 8 wherein the urea resin is comprised of an isobutylated urea, said urea comprising 4.4 to 4.5 by weight of the total vehicle weight.

References Cited

UNITED STATES PATENTS

| | | | |
|---|---|---|---|
| 2,871,209 | 1/1959 | Shelley | 260—850 |
| 2,877,130 | 3/1959 | Caron et al. | 260—22 |
| 3,196,119 | 7/1965 | Boller et al. | 260—22 |
| 3,287,293 | 11/1966 | Dalibor | 260—22 |
| 3,309,327 | 3/1967 | Gayer | 260—21 |
| 3,317,474 | 5/1967 | Jones | 260—850 |
| 3,338,743 | 8/1967 | Laganis | 260—850 |
| 3,366,563 | 1/1968 | Hart et al. | 260—22 |

HOSEA E. TAYLOR, JR., *Primary Examiner.*

R. W. GRIFFIN, *Assistant Examiner.*

U.S. Cl. X.R.

117—161, 167, 168; 260—22, 23, 26, 27, 30.8, 32.4, 32.6, 32.8, 33.4, 33.6, 39, 40, 41, 45.9, 826, 850, 862, 863, 864